United States Patent
Yamaguchi et al.

(10) Patent No.: US 10,889,526 B2
(45) Date of Patent: Jan. 12, 2021

(54) ENVIRONMENTAL RESISTANT COATING MEMBER

(71) Applicants: Japan Fine Ceramics Center, Nagoya (JP); IHI Corporation, Koto-ku (JP)

(72) Inventors: Norio Yamaguchi, Nagoya (JP); Taishi Yokoi, Nagoya (JP); Kenji Nakahira, Nagoya (JP); Hiroshi Nomura, Nagoya (JP); Satoshi Kitaoka, Nagoya (JP); Takeshi Nakamura, Koto-ku (JP); Tsuyoshi Takemoto, Koto-ku (JP)

(73) Assignees: Japan Fine Ceramics Center, Nagoya (JP); IHI Cornoration, Koto-ku (JP)

( * ) Notice: Subject to any disclaimer, the term of this patent is extended or adjusted under 35 U.S.C. 154(b) by 218 days.

(21) Appl. No.: 16/083,386

(22) PCT Filed: Feb. 21, 2017

(86) PCT No.: PCT/JP2017/006414
§ 371 (c)(1),
(2) Date: Sep. 7, 2018

(87) PCT Pub. No.: WO2017/154559
PCT Pub. Date: Sep. 14, 2017

(65) Prior Publication Data
US 2019/0092702 A1    Mar. 28, 2019

(30) Foreign Application Priority Data
Mar. 11, 2016    (JP) .................................. 2016-048810

(51) Int. Cl.
*C04B 41/89*    (2006.01)
*C04B 41/52*    (2006.01)
(Continued)

(52) U.S. Cl.
CPC ............ *C04B 41/89* (2013.01); *C04B 35/565* (2013.01); *C04B 35/597* (2013.01);
(Continued)

(58) Field of Classification Search
None
See application file for complete search history.

(56) References Cited

U.S. PATENT DOCUMENTS

2009/0324930 A1    12/2009  Tulyani et al.
2017/0190920 A1    7/2017   Nakamura et al.

FOREIGN PATENT DOCUMENTS

JP    5-270957 A    10/1993
JP    11-12050 A    1/1999
(Continued)

OTHER PUBLICATIONS

Extended European Search Report dated Aug. 16, 2019 in European Patent Application No. 17762901.1.
(Continued)

*Primary Examiner* — Daniel J. Schleis
(74) *Attorney, Agent, or Firm* — Oblon, McClelland, Maier & Neustadt, L.L.P.

(57) ABSTRACT

An environmental resistant coating member includes a SiC long fiber-reinforced ceramics substrate and an environmental barrier coating layer provided on the whole surface of the SiC long fiber-reinforced ceramics substrate. The environmental barrier coating layer includes a SiAlON bonding layer laminated on the SiC long fiber-reinforced ceramics substrate, a mullite layer laminated on the SiAlON bonding layer, a reaction inhibition layer laminated on the mullite layer, and a gradient layer formed on the reaction inhibition layer that gradually changes from a rare-earth disilicate to a rare-earth monosilicate. The reaction inhibition layer includes at least one of an alumina layer, a garnet layer, and
(Continued)

a rare-earth (mono)silicate layer. When the reaction inhibition layer includes two or more of these layers, the layers are formed in the order of the alumina layer, the garnet layer, and the rare-earth (mono)silicate layer from a mullite layer side toward a gradient layer side.

6 Claims, 3 Drawing Sheets

(51) Int. Cl.
*C04B 41/00* (2006.01)
*C04B 35/565* (2006.01)
*C04B 35/597* (2006.01)
*C04B 41/85* (2006.01)
*C04B 111/00* (2006.01)
*C04B 111/27* (2006.01)

(52) U.S. Cl.
CPC ............ *C04B 41/009* (2013.01); *C04B 41/52* (2013.01); *C04B 41/85* (2013.01); *C04B 2111/00482* (2013.01); *C04B 2111/27* (2013.01); *C04B 2235/3217* (2013.01); *C04B 2235/3225* (2013.01); *C04B 2235/3873* (2013.01); *C04B 2237/066* (2013.01); *C04B 2237/08* (2013.01)

(56) References Cited

FOREIGN PATENT DOCUMENTS

| | | |
|---|---|---|
| JP | 2008-308374 A | 12/2008 |
| JP | 2013-248852 A | 12/2013 |
| WO | WO 2016/140125 A1 | 9/2016 |

OTHER PUBLICATIONS

International Search Report dated May 9, 2017 in PCT/JP2017/006414 filed Feb. 21, 2017.

[Fig. 1]
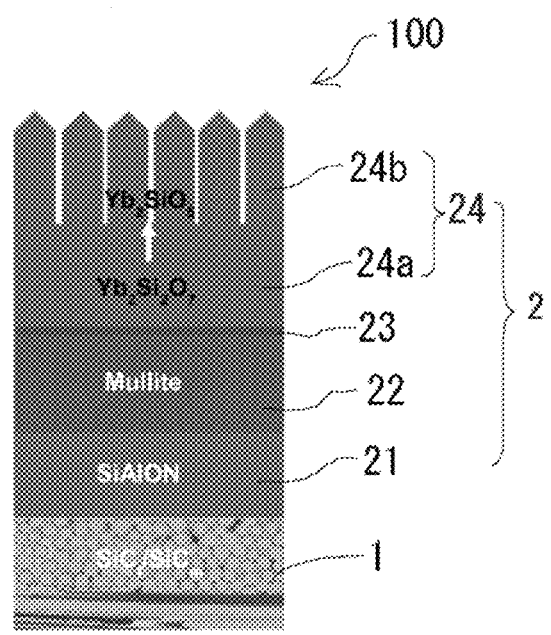
[Fig. 2]
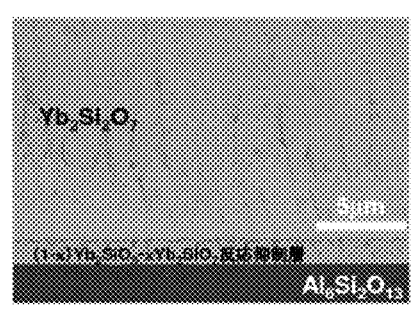

[Fig. 3]
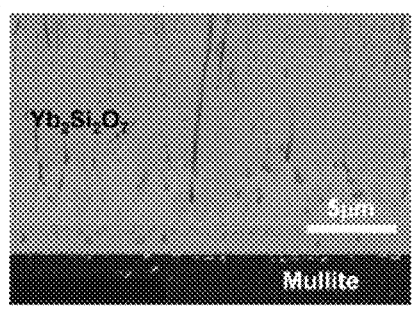

[Fig. 4]
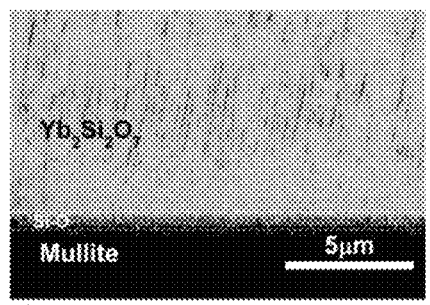
[Fig. 5]
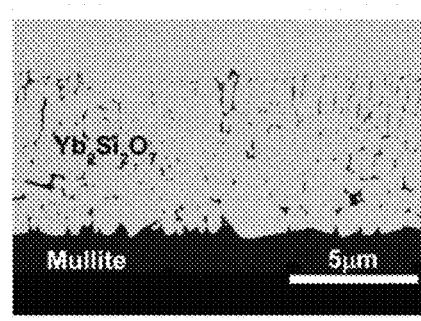

ENVIRONMENTAL RESISTANT COATING MEMBER

TECHNICAL FIELD

The present invention relates to environmental resistant coating members offering excellent resistance to corrosive gases such as oxygen and water vapor. More specifically, the present invention relates to an environmental resistant coating member including a silicon carbide (SiC) long fiber-reinforced ceramics substrate and an environmental barrier coating layer provided on the whole surface of the SiC long fiber-reinforced ceramics substrate.

BACKGROUND ART

In recent years, ceramics matrix composites (CMCs) have received attention as materials for hot-section components in aeroengine such as turbines and shrouds because CMCs are lighter in weight and have more excellent heat resistance and higher specific strength at high temperatures than that of heat-resistant alloys such as nickel-based superalloys. Particularly, SiC fiber-reinforced ceramics matrix composites (SiC/CMCs) using SiC fibers as reinforcing fibers have been regarded as promising materials for hot-section components in aeroengine because SiC/CMCs offer heat resistance above 1200° C. and have high damage tolerance.

However, when SiC/CMC substrates are used in high-temperature gas environments containing water vapor, oxidative wear and corrosion caused by water vapor progress so that durability is significantly reduced. Therefore, in order to use SiC/CMC substrates for aeroengine components, environmental barrier coatings offering resistance to high-temperature and high-pressure water vapor are absolutely necessary for SiC/CMC substrates.

CITATIONS LIST

Patent Literature

Patent Literature 1: JP 2013-248852 A

SUMMARY OF INVENTION

Technical Problems

Environmental barrier coating layers need to have high resistance to thickness reduction caused by water vapor, tightly adhere to SiC/CMC substrates, and have excellent thermal shock resistance. Oxide-based ceramics such as mullite, zirconia, and rare-earth silicates have been regarded as promising materials for environmental barrier coating layers for preventing recession of SiC/CMC substrates.

A rare-earth silicate denoted as $RE_2Si_2O_7$ or $RE_2SiO_5$ (wherein RE is a rare-earth element) is chemically and structurally stable at high temperatures of 1400° C. or higher and has both oxidation resistance and corrosion resistance. Therefore, the rare-earth silicate has sufficient durability even in high-temperature and high-pressure combustion gas environments such as aeroengines, and further has a thermal expansion coefficient close to that of SiC/CMC.

However, if a $RE_2Si_2O_7$ layer is directly formed on the surface of a Si bonding layer, part of a $SiO_2$-TGO (Thermally Grown Oxide) layer formed due to oxidation of the Si bonding layer is changed to $Si(OH)_4$ and volatilized so that the $RE_2Si_2O_7$ layer becomes porous and is therefore easily spalled from a substrate. For this reason, it is necessary to provide a mullite layer as an oxygen shielding layer between the Si bonding layer and the rare-earth silicate layer.

If, when the rare-earth silicate layer for preventing volatilization by water vapor and shielding water vapor is formed on the mullite oxygen shielding layer, excessive silica is present at the interface between the rare-earth silicate layer and the mullite layer, a liquid phase is formed at the interface when the environmental resistant coating member is exposed to high temperature. When the liquid phase resolidify, silica precipitatd at grain boundaries volatilizes as $Si(OH)_4$ so that the rare-earth silicate layer becomes porous, and therefore the environmental barrier coating layer is easily spalled from the underlying mullite layer.

Further, if, when the rare-earth silicate layer is formed, an excessive Si—O phase presents near the interface between the rare-earth silicate layer and the underlying mullite layer, a rare-earth silicate and mullite react to form a liquid phase. When the formed liquid phase resolidified, a Si—O phase precipitates at grain boundaries, reacts with water vapor, and volatilizes as $Si(OH)_4$ gas so that recession of the rare-earth silicate layer progresses.

Mullite, denoted as $3Al_2O_3.2SiO_2$, exhibits excellent oxygen shielding property, but its Si component preferentially volatilizes in a high-temperature and high-pressure combustion gas atmosphere containing water vapor, so that porous $Al_2O_3$ is formed which easily spalled off. In order to prevent the formation of $Al_2O_3$, an intermediate layer may be inserted between the rare-earth silicate layer and the mullite layer. For example, a mixed layer consisting of mullite and ytterbium silicate has been disclosed as an intermediate layer (see, for example, Patent Literature 1). However, this intermediate layer is intended to adjust thermal expansion coefficients.

The Si bonding layer has a melting point of about 1410° C. However, next-generation environmental barrier coatings are expected to be used at 1400° C., and therefore it is difficult to use the Si bonding layer. Furthermore, the volume expansion occurs when Si is oxidized to $SiO_2$, which may cause a problem that spalling-off of the coating layer is promoted.

In light of the above conventional technical problems, it is an object of the present invention to provide an environmental resistant coating member that includes a SiC/CMC substrate and an environmental barrier coating layer provided on the whole surface of the SiC/CMC substrate, in which formation of a liquid phase between a $RE_2Si_2O_7$ layer and a mullite layer in the environmental barrier coating layer is prevented to significantly improve adhesion between the $RE_2Si_2O_7$ layer and the mullite layer, and that can provide highly-durable hot-section components such as aeroengine turbines and shrouds.

Solutions to Problems

In order to achieve the object mentioned above, the present invention is directed to an environmental resistant coating member including: a SiC/CMC substrate; and an environmental barrier coating layer provided on the whole surface of the SiC/CMC substrate and including a bonding layer consisting of SiAlON, an oxygen shielding layer consisting of mullite, a reaction inhibition layer consisting of a rare-earth silicate or the like, and a water vapor shielding/thermal shock reduction layer consisting of a rare-earth silicate which are formed in this order.

The present invention provides the following.

1. An environmental resistant coating member including: a SiC/CMC substrate; and an environmental barrier coating layer provided on a whole surface of the SiC long fiber-reinforced ceramics substrate, wherein the environmental barrier coating layer includes a SiAlON bonding layer overlying on the SiC long fiber-reinforced ceramics substrate, a mullite layer overlying on the SiAlON bonding layer, a reaction inhibition layer overlying on the mullite layer, and a gradient layer having a composition that gradually changes from a rare-earth disilicate to a rare-earth monosilicate overlying on the reaction inhibition layer, and the reaction inhibition layer is at least one of an $Al_2O_3$ layer, a $RE_3Al_5O_{12}$ (wherein RE is a rare-earth element) layer, and a $[(1-x)RE_2SiO_5-xRE_2Si_2O_7]$ (wherein Re is a rare-earth element and $0 \leq x \leq 1$) layer.

2. The environmental resistant coating member according to 1, wherein a matrix of the SiC/CMC substrate is at least one of SiC, $Si_3N_4$, and SiAlON.

3. The environmental resistant coating member according to 1 or 2, wherein when SiAlON constituting the SiAlON bonding layer is denoted as $Si_{6-z}Al_zO_zN_{8-z}$, z satisfies $0 < z \leq 3.5$ at a temperature range of 1200 to 1600° C.

4. The environmental resistant coating member according to any one of 1 to 3, wherein the reaction inhibition layer includes at least two of the $Al_2O_3$ layer, the $RE_3Al_5O_{12}$ layer, and the $[(1-x)RE_2SiO_5-xRE_2Si_2O_7]$ layer, and the at least two layers are formed in the order of the $Al_2O_3$ layer, the $RE_3Al_5O_{12}$ layer, and the $[(1-x)RE_2SiO_5-xRE_2Si_2O_7]$ layer from a mullite layer side toward a gradient layer side.

5. The environmental resistant coating member according to any one of 1 to 4, wherein the gradient layer includes a rare-earth disilicate dense layer provided on a reaction inhibition layer side and a rare-earth monosilicate columnar layer provided on a surface side.

6. The environmental resistant coating member according to any one of 1 to 5, wherein the rare-earth element is ytterbium or lutetium.

Advantageous Effects of Invention

The environmental resistant coating member according to the present invention includes a SiC/CMC substrate and an environmental barrier coating layer formed on the whole surface of the SiC/CMC substrate and having a specific multilayered structure. This environmental barrier coating layer can shield the SiC/CMC substrate from oxygen, one of corrosive gases, and water vapor. Further, the reaction inhibition layer formed between the mullite layer and the gradient layer prevents the formation of a liquid phase between the rare-earth disilicate layer and the mullite layer so that adhesion between the rare-earth disilicate layer and the mullite layer is significantly improved, which allows the environmental barrier coating component to have excellent durability.

Further, when a matrix of the SiC/CMC substrate is at least one of SiC, $Si_3N_4$, and SiAlON, the SiC/CMC substrate is lightweight and offer excellent heat resistance and high specific strength at high temperatures, and therefore the environmental resistant coating member is useful as a material for hot section components such as aeroengine turbines.

Further, at a temperature range of 1200 to 1600° C., the SiAlON (denoted as $Si_{6-z}Al_zO_zN_{8-z}$) bonding layer with z of $0 < z \leq 3.5$ can adhere the SiC/CMC substrate and the mullite layer tightly together even at a high temperature exceeding 1400° C.

Further, when the reaction inhibition layer consists of at least two of an $Al_2O_3$ layer, a $RE_3Al_5O_{12}$ layer, and a $[(1-x)RE_2SiO_5-xRE_2Si_2O_7]$ layer, and the at least two layers are formed in order of the $Al_2O_3$ layer, the $RE_3Al_5O_{12}$ layer, and the $[(1-x)RE_2SiO_5-xRE_2Si_2O_7]$ layer from a mullite layer side to a gradient layer side, the reaction inhibition layer prevents formation of a liquid phase between the rare-earth disilicate layer and the mullite layer so that the rare-earth disilicate layer and the mullite layer can adhere together sufficiently.

Further, when the gradient layer consists of a rare-earth disilicate dense layer on a reaction inhibition layer side and a rare-earth monosilicate columnar layer on a surface side, the columnar layer acts as a thermal shock reduction layer so that thermal cycle resistance can be improved.

Further, when the rare-earth element is ytterbium or lutetium, the environmental resistant coating member can offer more excellent water vapor shielding property and thermal shock reduction property.

BRIEF DESCRIPTION OF DRAWINGS

FIG. 1 is a schematic diagram for explaining the multi-layered structure of an environmental resistant coating member according to the present invention.

FIG. 2 is an explanatory diagram based on a scanning electron micrograph of a desired portion of the cross section of an environmental resistant coating member of Example.

FIG. 3 is an explanatory diagram based on a scanning electron micrograph of a desired portion of the cross section of an environmental resistant coating member of Example after heat treatment performed under predetermined conditions.

FIG. 4 is an explanatory diagram based on a scanning electron micrograph of a desired portion of the cross section of an environmental resistant coating member of Comparative Example.

FIG. 5 is an explanatory diagram based on a scanning electron micrograph of a desired portion of the cross section of an environmental resistant coating member of Comparative Example after heat treatment performed under predetermined conditions.

DESCRIPTION OF EMBODIMENTS

Hereinbelow, the present invention will be described in detail with reference to the drawings.

An environmental barrier coating component 100 according to the present invention includes a SiC/CMC substrate 1 and an environmental barrier coating layer 2 provided on the whole surface of the SiC/CMC substrate 1. Further, the environmental barrier coating layer 2 includes a SiAlON bonding layer 21 formed on the SiC/CMC substrate 1, a mullite layer 22 formed on the SiAlON bonding layer 21, a reaction inhibition layer 23 formed on the mullite layer 22, and a gradient layer 24 formed on the reaction inhibition layer 23 and having a composition that gradually changes from a rare-earth disilicate to a rare-earth monosilicate toward surface (see FIG. 1).

The SiC/CMC substrate 1 includes SiC long fibers for reinforcing a substrate and a ceramics matrix. In addition to the SiC long fibers, long fibers such as $Si_3N_4$ fibers, carbon fibers, or graphite fibers may be mixed as reinforcing fibers. A ceramic constituting the matrix of the SiC/CMC substrate 1 may be SiC. Other examples of the ceramic include $Si_3N_4$ and SiAlON.

Both the long fibers and the matrix of the SiC/CMC substrate 1 may be made of SiC. Examples of the matrix other than SiC include $Si_3N_4$ and SiAlON. When the matrix is made of at least one of SiC, $Si_3N_4$, and SiAlON, the SiC/CMC substrate 1 is lightweight and has excellent heat resistance and high specific strength at high temperatures. The matrix is preferably SiC because SiC is excellent in oxidation resistance.

The environmental barrier coating layer 2 is provided on the whole surface of the SiC/CMC substrate 1. The SiAlON bonding layer 21, which is one of the layers constituting the environmental barrier coating layer 2, is directly formed on the whole surface of the SiC/CMC substrate 1. SiAlON used for the SiAlON bonding layer 21 is not particularly limited, and $\alpha'$-SiAlON, $\beta'$-SiAlON, or ($\alpha'$+$\beta'$) composite SiAlON can be used. However, $\beta'$-SiAlON is preferred because $\beta'$-SiAlON is stable at a high temperature around 1400° C.

Further, when SiAlON used for the SiAlON bonding layer 21 is denoted as $Si_{6-z}Al_zO_zN_{8-z}$, z preferably satisfies 0<z≤3.5, especially 2.0<z3.0 at a temperature range of 1200 to 1600° C., especially 1300 to 1500° C. When the SiAlON bonding layer 21 is formed using such SiAlON, the SiC/CMC substrate 1 and the mullite layer 22 can adhere tightly together with the SiAlON bonding layer 21 being interposed between them.

As described above, the mullite layer 22 is formed on the SiAlON bonding layer 21. Mullite is an aluminosilicate having a single chain structure, that is, a compound of aluminum oxide and silicon dioxide, and is a ceramic denoted as $3Al_2O_3 \cdot 2SiO_2$ or $Al_6Si_2O_{13}$. When the mullite layer 22 is formed by, for example, electron beam evaporation, alumina and silica are used as evaporation materials, and are evaporated by electron beams independent of each other so that the ratio between alumina and silica can be precisely controlled. Therefore, the mullite layer 22 can have a desired composition.

Further, the gradient layer 24 is formed on the mullite layer 22 with the reaction inhibition layer 23 being interposed between them. The gradient layer 24 has a composition that gradually changes from a rare-earth disilicate to a rare-earth monosilicate. The rare-earth element is not particularly limited, and examples thereof include Yb, Lu, Sm, Eu, and Tm. Among them, Yb and Lu are preferred, and Yb is particularly preferred. When the rare-earth element is Yb or Lu, rare-earth silicate can prevent diffusion and permeation of corrosive gases and phase separation, segregation, etc. in the layer sufficiently. Further, phase transformation of rare earth silicate involving volume change does not occur at high temperatures, which allows the gradient layer 24 to have excellent stability. Specific examples of the rare-earth disilicate to be used include $Yb_2Si_2O_7$ and $Lu_2Si_2O_7$, and specific examples of the rare-earth monosilicate to be used include $Yb_2SiO_5$ and $Lu_2SiO_5$.

The gradient layer 24 is not particularly limited as long as its composition gradually changes from a rare-earth disilicate to a rare-earth monosilicate. The gradient layer 24 may be one including a rare-earth disilicate dense layer 24a provided on a mullite layer 22 side and a rare-earth monosilicate columnar layer 24 provided on a surface side (see FIG. 1). When the gradient layer 24 has such a structure, the entry of water vapor is sufficiently blocked by the rare-earth disilicate dense layer 24a, and thermal shock is sufficiently reduced by the rare-earth monosilicate columnar layer 24b.

When the denseness of the rare-earth disilicate dense layer 24a is represented using a relative density as an indicator, the relative density is preferably 96% or higher, more preferably 98% or higher, particularly preferably 99% or higher. The average diameter of columnar bodies of the rare-earth monosilicate columnar layer 24b as the outermost layer of the environmental barrier coating layer 2 may be 2 to 20 μm. Alternatively, the outermost layer may be a rare-earth monosilicate porous layer. Also in this case, thermal shock is sufficiently reduced as in the case of the columnar layer.

It is to be noted that the relative density can be calculated by dividing a bulk density measured by the Archimedes method using pure water as a solvent by a theoretical density.

A method for forming each of the layers constituting the environmental barrier coating layer 2 is not particularly limited, and examples thereof include: a physical vapor deposition method such as electron beam physical vapor deposition, thermal deposition, ion beam deposition, sputtering, or reactive sputtering; a chemical vapor deposition method such as thermal chemical vapor deposition, plasma chemical vapor deposition, or electron cyclotron resonance plasma chemical vapor deposition; and a thermal spraying method such as plasma spraying. Among these formation methods, electron beam physical vapor deposition is preferred.

When the gradient layer 24 is formed by electron beam physical vapor deposition, a rare-earth oxide and a silica are used as evaporation materials, and are evaporated by electron beams independent of each other so that the ratio between the vapor flux of rare-earth oxide and silica can be precisely controlled. Therefore, the gradient layer 24 can have a desired composition. Further, the dense layer 24a having a predetermined denseness can be easily formed as an inner layer of the gradient layer 24, and the columnar layer 24b having a predetermined average diameter or a porous layer having a predetermined porosity can be easily formed as a surface layer of the gradient layer 24. Each of the other layers constituting the environmental barrier coating layer 2 is preferably formed by electron beam physical vapor deposition. This is advantageous in terms of the production efficiency and equipment cost of the environmental barrier coating component 100.

On the other hand, when the environmental barrier coating layer 2 made of a composite oxide containing $SiO_2$, such as a rare-earth silicate, is formed by atmospheric plasma spraying, $SiO_2$ having a high vapor pressure is preferentially evaporated during melting of a raw material powder in plasma so that the composition of formed layer is poor in Si. Further, by atmospheric plasma spraying, it is not easy to form the dense layer 24a, which may cause a problem that it is difficult to sufficiently develop a water vapor shielding property, an oxygen shielding property, and the like. Moreover, even the environmental barrier coating layer formed by electron beam physical vapor deposition is required improved water vapor shielding property, an oxygen shielding property, and the like.

In order to solve the above problem, in the present invention, the reaction inhibition layer 23 is interposed between the mullite layer 22 and the gradient layer 24. The reaction inhibition layer 23 includes at least one of an $Al_2O_3$ layer, a $RE_3Al_5O_{12}$ layer (garnet layer, RE is a rare-earth element), and a $[(1-x)RE_2SiO_5\text{-}xRE_2Si_2O_7]$ layer (RE is a rare-earth element, 0≤x≤1). When such a reaction inhibition layer 23 is interposed between the mullite layer 22 and the gradient layer 24, it is possible to prevent or at least reduce a further reaction, such as liquid phase formation, even when unreacted silica is present during the formation of the rare-earth disilicate dense layer 24a of the gradient layer 24 provided on a reaction inhibition layer 23 side.

The reaction inhibition layer 23 may be formed of only one of the above three layers. In this case, the reaction inhibition layer 23 consists of only the $Al_2O_3$ layer. In such a case where the reaction inhibition layer 23 consists of only the $Al_2O_3$ layer, the thickness of the $Al_2O_3$ layer is preferably 1 to 50 µm, particularly preferably 1 to 20 µm. If the thickness of the $Al_2O_3$ layer exceeds 50 µm, there is a case where tensile stress is applied to the $Al_2O_3$ layer during cooling after film formation due to the difference in thermal expansion coefficient between the mullite layer 22 and the rare-earth disilicate dense layer 24a of the gradient layer 24 so that cracking occurs in the $Al_2O_3$ layer.

Further, the reaction inhibition layer 23 may have a multilayered structure consisted of at least two of the $Al_2O_3$ layer, the $RE_3Al_5O_{12}$ layer, and the $[(1-x)RE_2SiO_5-xRE_2Si_2O_7]$ layer. In this case, the at least two layers are formed in order of the $Al_2O_3$ layer, the $RE_3Al_5O_{12}$ layer, and the $[(1-x)RE_2SiO_5-xRE_2Si_2O_7]$ layer from a mullite layer 22 side toward a gradient layer 24 side. This makes it possible to sufficiently prevent or at least reduce a further reaction such as liquid phase formation.

For example, the reaction inhibition layer 23 may be the $[(1-x)RE_2SiO_5-xRE_2Si_2O_7]$ layer. In this case, part of $RE_2O_3$ in the $[(1-x)RE_2SiO_5-xRE_2Si_2O_7]$ layer reacts to form $RE_2Si_2O_7$ so that a layer containing them is formed. Therefore, a further reaction, such as liquid phase formation, is prevented or at least reduced.

For example, the reaction inhibition layer 23 may be a bilayer of the $Al_2O_3$ layer and the $[(1-x)RE_2SiO_5-xRE_2Si_2O_7]$ layer. In this case, part of the $Al_2O_3$ layer reacts to form $RE_3Al_5O_{12}$ and $RE_2Si_2O_7$ at the interface so that a layer containing them is formed. Therefore, a further reaction, such as liquid phase formation, is prevented or at least reduced.

Further, also when the reaction inhibition layer 23 has such a composition as described above, the $Al_2O_3$ layer needs to have a thickness of at least 1 µm in order to provide a layer made of substantially only $Al_2O_3$ near the interface with the mullite layer 22. Further, the reaction inhibition layer 23 is most stable when adjacent layers that coexist in an equilibrium state are formed. Therefore, the reaction inhibition layer 23 preferably has a layered structure in which an $Al_2O_3$ layer, a layer containing $RE_3Al_5O_{12}$ and $RE_2Si_2O_7$, and a $[(1-x)RE_2SiO_5-xRE_2Si_2O_7]$ layer are formed from a mullite layer 22 side toward a rare-earth disilicate dense layer 24a side.

The reaction inhibition layer 23 most preferably has a three-layer structure in which the $Al_2O_3$ layer, the $RE_3Al_5O_{12}$ layer, and the $[(1-x)RE_2SiO_5-xRE_2Si_2O_7]$ layer are layered in this order from a mullite layer 22 side toward a rare-earth disilicate dense layer 24a side. In this case, it is important that the thickness of the reaction inhibition layer 23 is reduced as much as possible. Each of the layers constituting the reaction inhibition layer 23 has a thermal expansion coefficient higher than those of the mullite layer 22 and the rare-earth disilicate dense layer 24a. Therefore, if each of the layers described above is thick, cracking occurs in the thickness direction of the reaction inhibition layer 23 during cooling after film formation due to the difference in thermal expansion coefficient.

Further, when the reaction inhibition layer 23 has a three-layer structure, the thickness of the $Al_2O_3$ layer is preferably 1 to 30 µm, particularly preferably 1 to 10 µm, the thickness of the $RE_3Al_5O_{12}$ layer is preferably 0.5 to 10 µm, particularly preferably 0.5 to 2 µm, and the thickness of the $[(1-x)RE_2SiO_5-xRE_2Si_2O_7]$ layer is preferably 1 to 10 µm, particularly preferably 1 to 2 µm. Further, the total thickness of the $Al_2O_3$ layer, the $RE_3Al_5O_{12}$ layer, and the $[(1-x)RE_2SiO_5-xRE_2Si_2O_7]$ layer, that is the thickness of the reaction inhibition layer 23 is preferably 2.5 to 50 µm, particularly preferably 2.5 to 30 µm. When the thickness of each of the layers and the total thickness are within the above ranges, it is possible to prevent the occurrence of cracking in the thickness direction of the reaction inhibition layer 23 due to the difference in thermal expansion coefficient between the mullite layer 22 and the rare-earth disilicate dense layer 24a.

It is to be noted that the rare-earth element (RE) in the reaction inhibition layer 23 is not particularly limited, either, and examples thereof are the same as those mentioned above with reference to the gradient layer 24, that is, Yb, Lu, Sm, Eu, and Tm. Among them, Yb and Lu are preferred, and Yb is particularly preferred. When the rare-earth element is Yb or Lu, diffusion and permeation of corrosive gasses in the reaction inhibition layer 23 and phase separation, segregation, etc in the layer can sufficiently be prevented.

Products obtained using the environmental resistant coating member 100 are not particularly limited, either, and examples thereof include (1) products used in transport equipment, (2) products used in various plants, and (3) products used in other plants, facilities, and equipment. Examples of the products used in transport equipment (1) include parts and components used at high temperatures in various vehicles such as aircraft, ships, automobiles, and railroad vehicles and space equipment, such as internal-combustion engines, boilers (e.g., heaters, headers·main steam pipes, high-temperature and high-pressure valves), steam turbines, gas turbines (e.g., high-temperature rotors, inner casings, steam valves, low-pressure rotors), heat exchangers, reformers, pipes, heat shields, heat insulators, and fixing components.

Examples of the products used in various plants (2) include parts and components used at high temperatures in plants for producing various products and energy supply plants, such as internal-combustion engines, boilers (e.g., heaters, headers·main steam pipes, high-temperature and high-pressure valves), steam turbines, gas turbines (e.g., high-temperature rotors, inner casings, steam valves, low-pressure rotors), heat exchangers, reformers, pipes, heat shields, heat insulators, and fixing components. Examples of the products used in other plants, facilities, and equipment (3) include parts and components used at high temperatures in various plants, facilities, and equipment other than (1) and (2), such as internal-combustion engines, boilers (e.g., heaters, headers·main steam pipes, high-temperature and high-pressure valves), steam turbines, gas turbines (e.g., high-temperature rotors, inner casings, steam valves, low-pressure rotors), heat exchangers, reformers, pipes, heat shields, heat insulators, and fixing components.

EXAMPLES

Hereinbelow, examples according to the present invention and comparative examples will specifically be described with reference to the drawings, but the present invention is not limited to the following examples.

Example 1

A mullite substrate simulating a mullite layer was heated to 1020° C., and an environmental barrier coating layer was formed on the whole surface of the heated mullite substrate by electron beam physical vapor deposition. The environmental barrier coating layers deposited on the mullite substrate in the order of a [(1-x)Yb$_2$SiO$_5$-xYb$_2$Si$_2$O$_7$] layer as a reaction inhibition layer and a Yb$_2$Si$_2$O$_7$ layer.

The [(1-x)Yb$_2$SiO$_5$-xYb$_2$Si$_2$O$_7$] layer as a reaction inhibition layer was formed using a raw material of Yb$_2$O$_3$ and a raw material of SiO$_2$ under the condition of a deposition time of 120 seconds. More specifically, the [(1-x)Yb$_2$SiO$_5$-xYb$_2$Si$_2$O$_7$] layer was formed by evaporating the raw material of Yb$_2$O$_3$ by an electron beam power of 18.0 kW and evaporating the raw material of SiO$_2$ by an electron beam power of 4.0 kW. The thickness of the [(1-x)Yb$_2$SiO$_5$-xYb$_2$Si$_2$O$_7$] layer was 2 µm.

The Yb$_2$Si$_2$O$_7$ dense layer provided on the surface side of the environmental resistant coating member was formed using a raw material of Yb$_2$O$_3$ and a raw material of SiO$_2$ under the condition of a deposition time of 900 seconds. More specifically, the Yb$_2$Si$_2$O$_7$ dense layer provided on a Yb$_2$SiO$_5$ layer (reaction inhibition layer) side was formed by evaporating the raw material mass of Yb$_2$O$_3$ by an electron beam power of 19.0 kW and evaporating the raw material mass of SiO$_2$ by an electron beam power of 5.1 kW. The thickness of the Yb$_2$Si$_2$O$_7$ dense layer was 20 µm.

Further, the thus produced environmental resistant coating member was subjected to heat treatment at 1400° C. in an air atmosphere for 5 hours.

Comparative Example 1

Similarly to Example 1, a mullite substrate was heated to 1020° C., and an environmental barrier coating layer was formed on the whole surface of the mullite substrate by electron beam physical vapor deposition. As the environmental barrier coating layer, Yb$_2$Si$_2$O$_7$ was formed on the whole surface of the heated mullite substrate. In Comparative Example 1, no [(1-x)Yb$_2$SiO$_5$-xYb$_2$Si$_2$O$_7$] layer was formed as a reaction inhibition layer.

The Yb$_2$Si$_2$O$_7$ dense layer provided on a mullite layer side was formed under the condition of a film deposition time of 1500 seconds by evaporating a raw material of Yb$_2$O$_3$ by an electron beam power of 16.6 kW and evaporating a raw material of SiO$_2$ by an electron beam power of 4.5 kW so that the evaporation amounts of the raw material mass of Yb$_2$O$_3$ and the raw material mass of SiO$_2$ were adjusted in the same manner as in Example 1. The thickness of the Yb$_2$Si$_2$O$_7$ dense layer was 20 µm. Further, the thus produced environmental resistant coating member was subjected to heat treatment in the same manner as in Example 1.

Evaluation of Environmental Resistant Coating Member

The cross-section of part of the mullite substrate, the reaction inhibition layer, and the Yb$_2$Si$_2$O$_7$ dense layer of the environmental resistant coating member produced in Example 1 and the cross-section of part of the mullite substrate and the Yb$_2$Si$_2$O$_7$ dense layer of the environmental resistant coating member produced in Comparative Example 1 were observed with a scanning electron microscope to evaluate the degree of erosion. More specifically, a test piece was cut out from each of the environmental resistant coating members produced in Example 1 and Comparative Example 1, and the cut surface of the test piece was finished with a #800 grinding wheel, then smoothed by ion milling, and observed with a scanning electron microscope (Model "SU-8000" manufactured by Hitachi, Ltd.). The test piece of Example 1 was observed with 3000 magnification, and the test piece of Comparative Example 1 was observed with 4000 magnification.

Evaluation results (observation results) are shown in FIGS. 2 to 5. FIG. 2 shows the evaluation result of the component of Example 1 before heat treatment in which a reaction inhibition layer was formed. FIG. 3 shows the evaluation result of the component of Example 1 after heat treatment in which a reaction inhibition layer was formed. FIG. 4 shows the evaluation result of the component of Comparative Example 1 before after heat treatment in which no reaction inhibition layer was formed, and FIG. 5 shows the evaluation result of the component of Comparative Example 1 before heat treatment in Which no reaction inhibition layer was formed. It is to be noted that such heat treatment as described above is usually performed on components to be actually used as some hot parts such as aeroengine turbines.

According to FIGS. 2 to 5, in the component having no reaction inhibition layer shown in FIG. 4, a Si—O layer was observed near the interface before heat treatment. Further, as can be seen from FIG. 5, a liquid phase was formed by a reaction with the Si—O layer present near the interface due to heat treatment, and particularly, Si—O was generated as the origin of large pores at the interface. On the other hand, as can be seen from FIG. 2, no Si—O layer was present near the interface in the component having a reaction inhibition layer before heat treatment, and as can be seen from FIG. 3, no liquid phase was formed even after heat treatment. These results support unique advantageous effects obtained by providing a reaction inhibition layer.

INDUSTRIAL APPLICABILITY

The present invention can be applied to the technical field of environmental resistant coating member that can be used at a high temperature of 1400° C. and that have excellent oxygen shielding property and water vapor shielding property, and is useful in the field of, for example, hot section components such as aeroengine turbines and shrouds.

REFERENCE SIGNS LIST

100; Environmental resistant coating member
1; SiC long fiber-reinforced ceramics substrate (SiC/CMC substrate)
2; Environmental barrier coating layer
21; Sialon bonding layer
22; Mullite layer
23; Reaction inhibition layer
24; Gradient layer whose composition gradually changes from rare-earth disilicate to rare-earth monosilicate
24a; Rare-earth disilicate dense layer
24b; Rare-earth monosilicate columnar layer

The invention claimed is:
1. An environmental resistant coating member comprising:
a SiC fiber-reinforced ceramics substrate; and an environmental barrier coating layer provided on a whole surface of the SiC fiber-reinforced ceramics substrate, wherein
the environmental barrier coating layer comprises a SiAlON bonding layer formed on the SiC fiber-reinforced ceramics substrate, a mullite layer formed on the SiAlON bonding layer, a reaction inhibition layer formed on the mullite layer, and a gradient layer formed on the reaction inhibition layer and having a composition that gradually changes from a rare-earth disilicate to a rare-earth monosilicate, and
the reaction inhibition layer is at least one of an Al$_2$O$_3$ layer, a RE$_3$Al$_5$O$_{12}$ layer, and a [(1-x)RE$_2$SiO$_5$-xRE$_2$Si$_2$O$_7$] layer,
wherein RE is a rare-earth element and 0≤x≤1.

2. The environmental resistant coating member according to claim 1, wherein a matrix of the SiC fiber-reinforced ceramics substrate is at least one of SiC, $Si_3N_4$, and SiAlON.

3. The environmental resistant coating member according to claim 1, wherein when SiAlON constituting the SiAlON bonding layer is denoted as $Si_{6-z}Al_zO_zN_{8-z}$, z satisfies $0<z\leq 3.5$ at a temperature range from 1200 to 1600° C.

4. The environmental resistant coating member according to claim 1, wherein the reaction inhibition layer comprises at least two of the $Al_2O_3$ layer, the $RE_3Al_5O_{12}$ layer, and the $[(1-x)RE_2SiO_5-xRE_2Si_2O_7]$ layer, and the at least two layers are formed in the order of the $Al_2O_3$ layer, the $RE_3Al_5O_{12}$ layer, and the $[(1-x)RE_2SiO_5-xRE_2Si_2O_7]$ layer from a mullite layer side toward a gradient layer side.

5. The environmental resistant coating member according to claim 1, wherein the gradient layer comprises a rare-earth disilicate layer provided on a reaction inhibition layer side and a rare-earth monosilicate columnar layer provided on a surface side.

6. The environmental resistant coating member according to any one of claims 1 to 5, wherein the rare-earth element is ytterbium or lutetium.

\* \* \* \* \*

UNITED STATES PATENT AND TRADEMARK OFFICE
CERTIFICATE OF CORRECTION

Page 1 of 1

PATENT NO. : 10,889,526 B2
APPLICATION NO. : 16/083386
DATED : January 12, 2021
INVENTOR(S) : Norio Yamaguchi et al.

It is certified that error appears in the above-identified patent and that said Letters Patent is hereby corrected as shown below:

On the Title Page

Item (73), should read:
--(73) Assignees: Japan Fine Ceramics Center, Nagoya (JP);
                IHI Corporation, Koto-ku (JP)--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*